July 25, 1967

A. ANDERSON 3,332,532

LOADER AND FEEDER MECHANISM

Original Filed April 25, 1963

INVENTOR:
Axel Anderson
BY
Hofgren, Wegner, Allen,
Stellman & McCord Att'ys

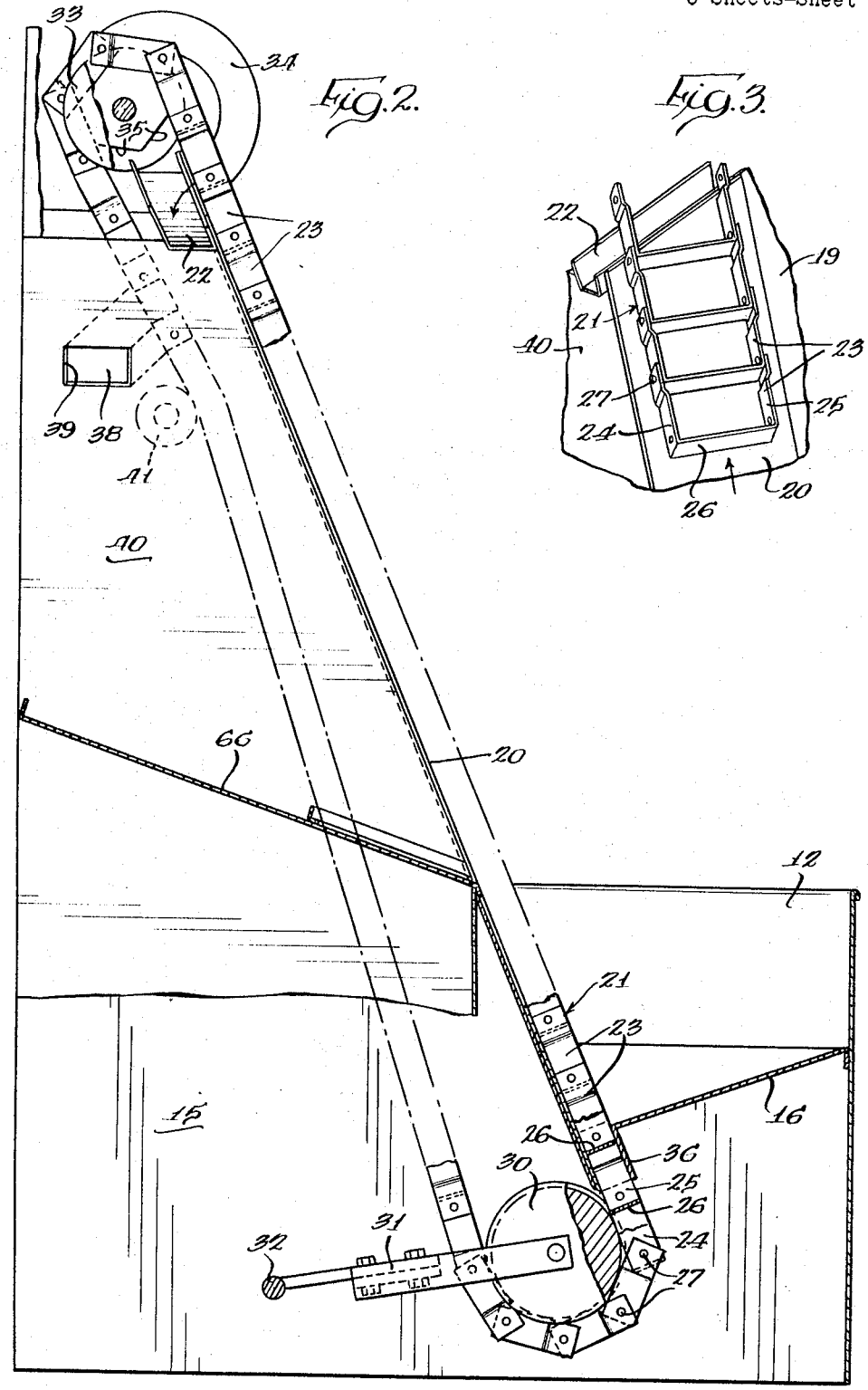

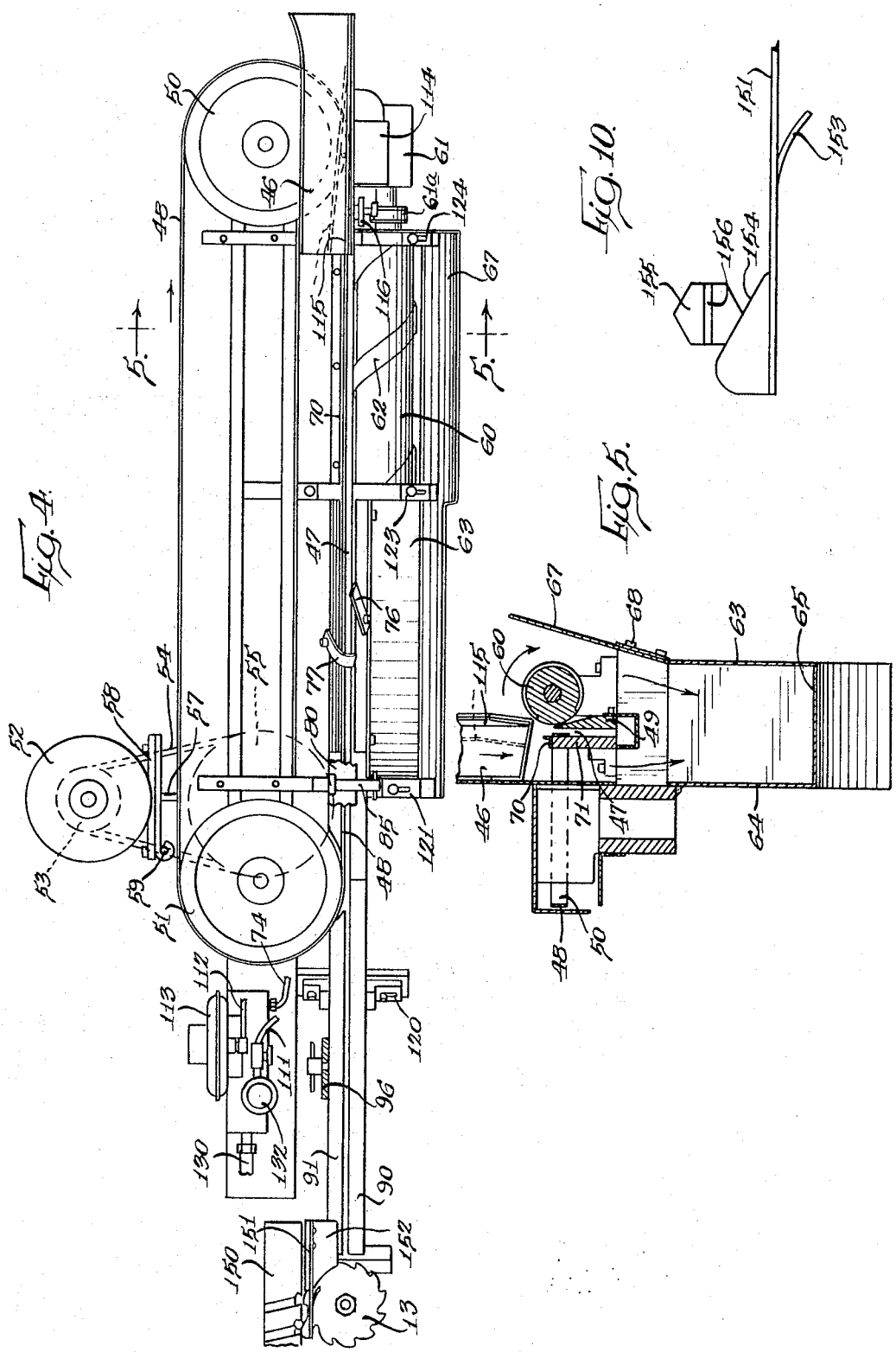

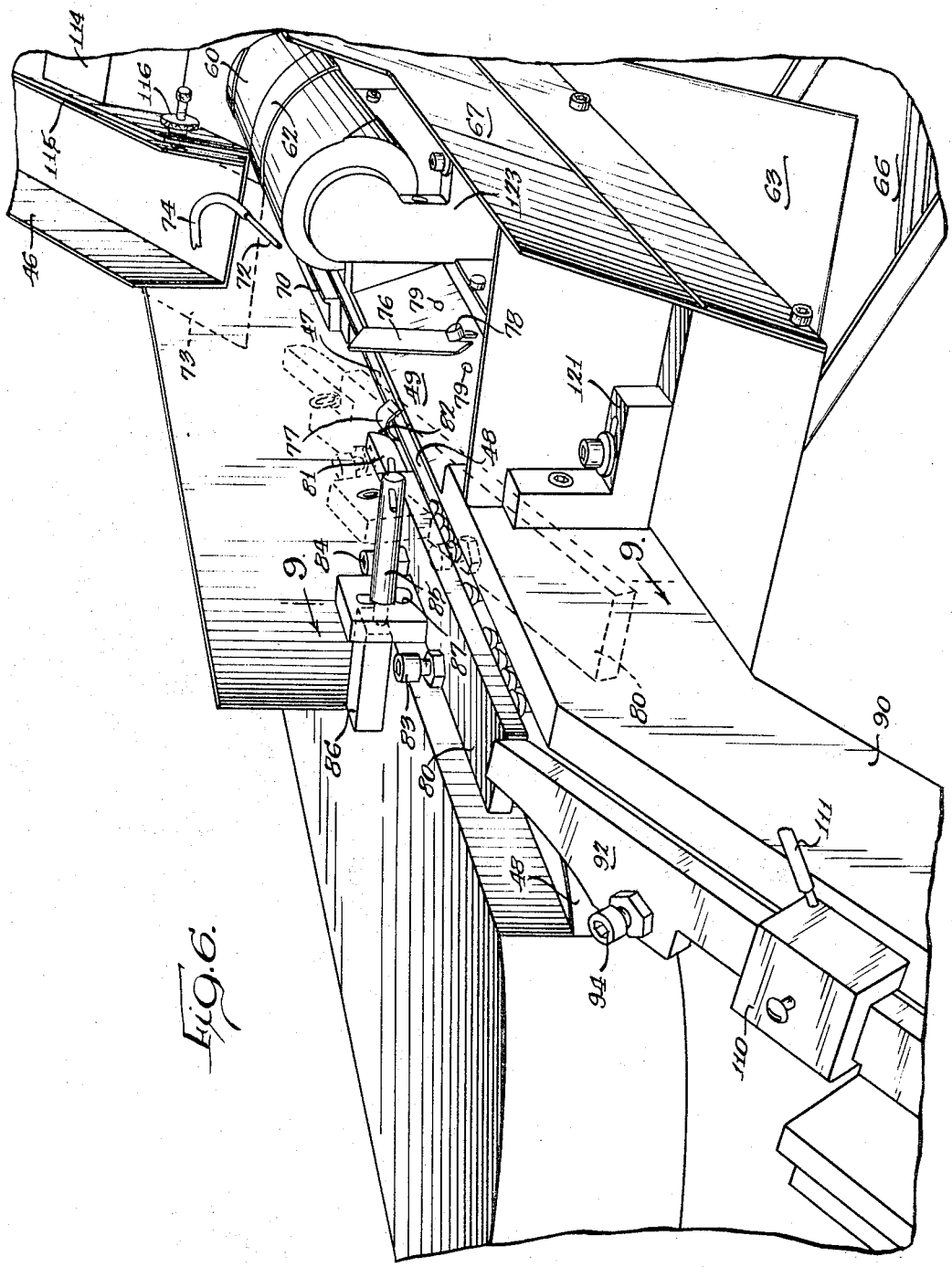

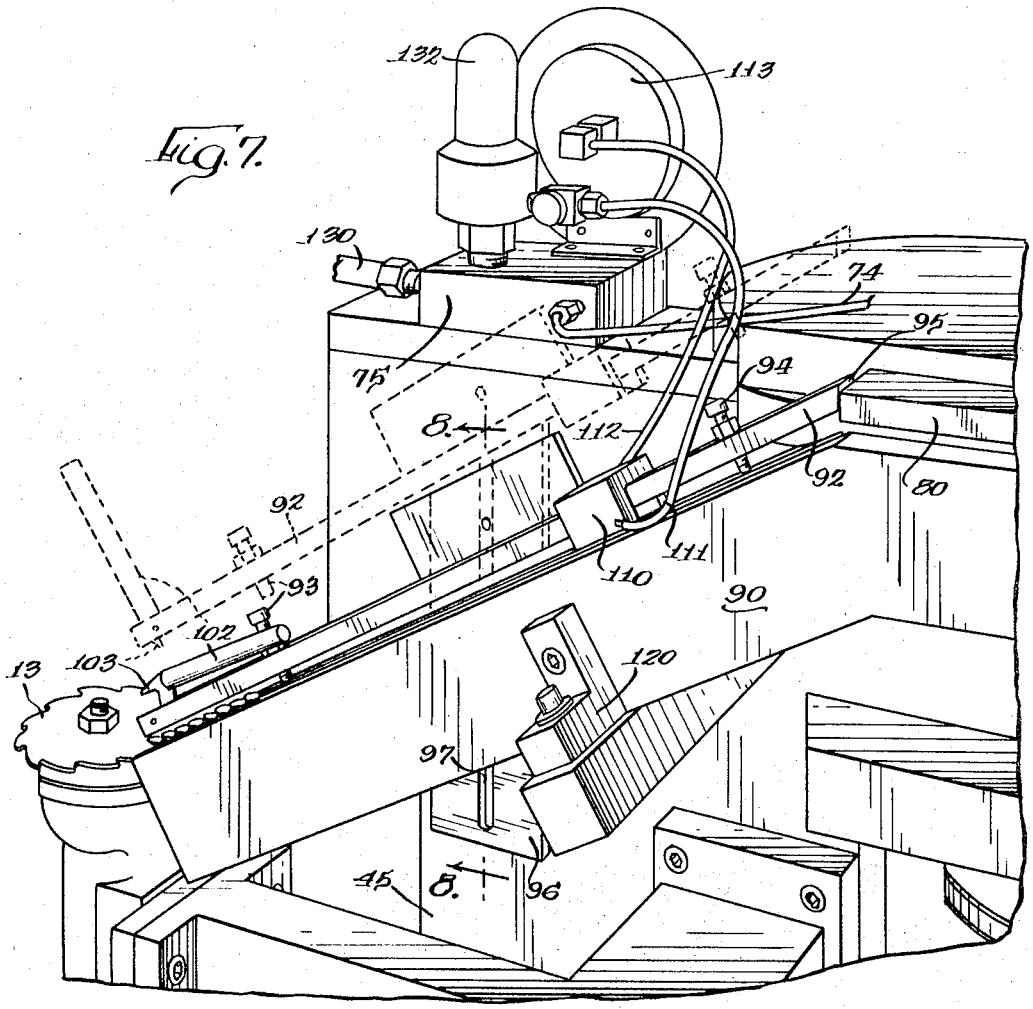

United States Patent Office 3,332,532
Patented July 25, 1967

3,332,532
LOADER AND FEEDER MECHANISM
Axel Anderson, Rockford, Ill., assignor to Sundstrand Corporation, a corporation of Illinois
Original application Apr. 25, 1963, Ser. No. 275,713, now Patent No. 3,229,804, dated Jan. 18, 1966. Divided and this application June 3, 1965, Ser. No. 460,992
14 Claims. (Cl. 198—48)

This application is a division of co-pending application Ser. No. 275,713 of Axel Anderson entitled, "Loader and Feeder Mechanism."

This invention relates to a high speed handling mechanism for blanks and more particularly to loader and feeder mechanism for supplying blanks such as screw blanks to a machine tool.

An object of this invention is to provide a new and improved loader and feeder mechanism.

Another object of this invention is to provide a new and improved loader and feeder mechanism in which an elevating conveyor carries blanks from a storage bin to an elevated discharge position with the conveyor being constructed of generally U-shaped stirrup links.

A related object is to provide a loader and feeder mechanism as set forth in the preceding paragraph wherein the legs of adjacent links overlap one another, and are offset so that a conveyor of constant width is provided.

A further object of the invention is to provide a loader and feeder mechanism as described above with chute means adjacent the discharge position, with the chute means being inclined with respect to the links of the elevating conveyor so that blanks will be uniformly fed into the chute means at a controlled rate as the conveyor links move therepast.

Still another object of the invention is to provide a storage bin for a loader and feeder mechanism with a self-clearing opening in the bottom thereof adapted to receive the elevating conveyor therethrough.

A still further object of the invention is to provide a drive pulley for an elevating conveyor as described above with the pulley having flats shaped to correspond to the flat sections of successive conveyor links.

Still another object of the invention is to provide a loader and feeder mechanism with means for providing a slack in the elevating conveyor whereby a jam in the conveyor will result in relative movement of the conveyor and its driving member.

Further objects and advantages will become apparent from the following detailed description taken in connection with the accompanying drawings, in which:

FIG. 2 is a vertical section on an enlarged scale of a part of the loader mechanism and taken generally along the line 2—2 in FIG. 1;

FIG. 3 is a fragmentary perspective view of the loading container and associated chute means;

FIG. 4 is a fragmentary plan view of the mechanism shown in FIG. 1 and with the belt cover removed;

FIG. 5 is a vertical section taken generally along the line 5—5 in FIG. 4;

FIG. 6 is a perspective view of the feeding mechanism;

FIG. 7 is a perspective view of the final part of the feeding mechanism and showing parts thereof in both full line and broken line position;

FIG. 8 is a fragmentary vertical section taken generally along the line 8—8 in FIG. 7;

FIG. 9 is a fragmentary vertical section taken generally along the line 9—9 in FIG. 6; and FIG. 10 is a fragmentary plan view of alignment mechanism.

Figure 1:
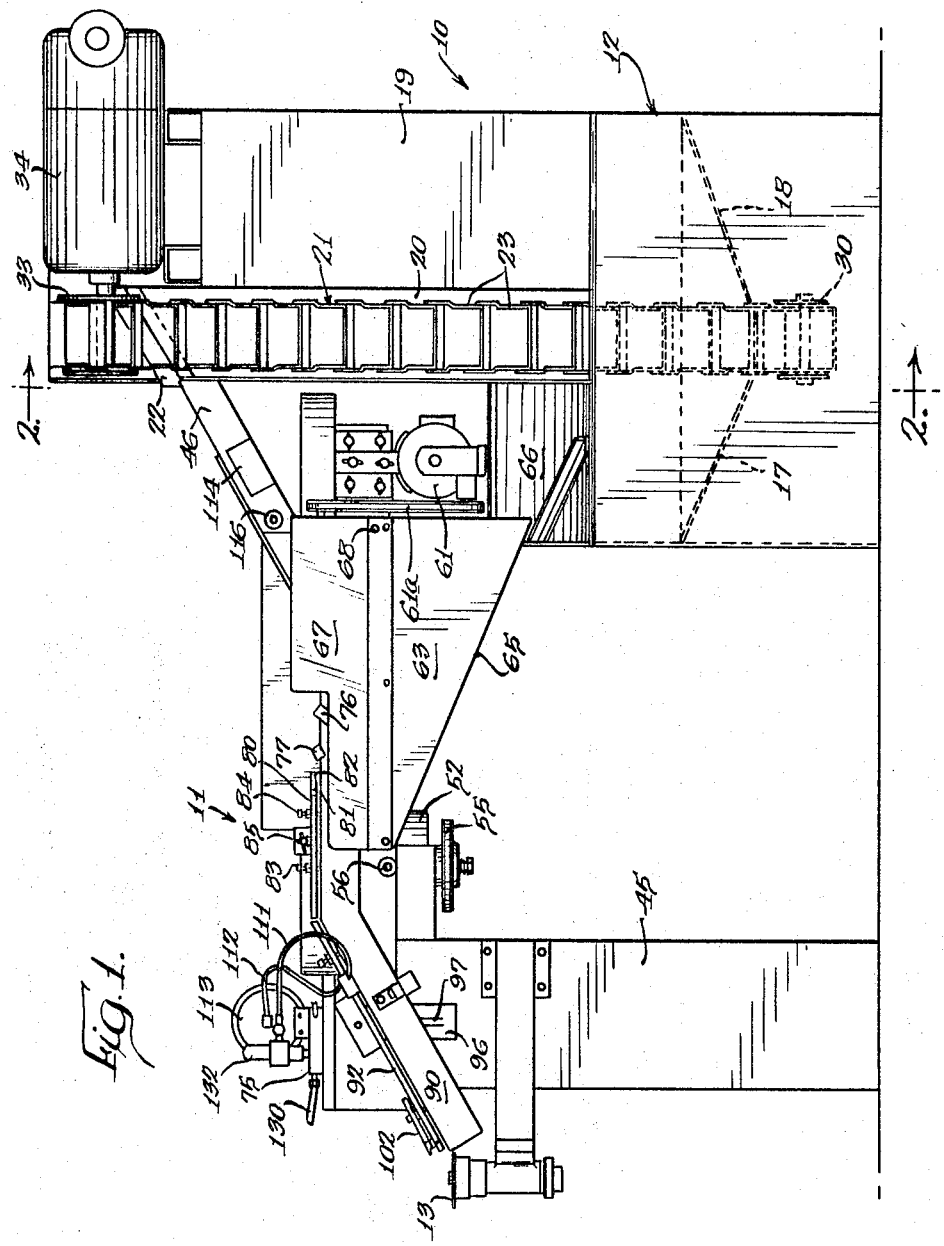
FIG. 1 is a front elevational view of the loader and feeder mechanism.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The loader and feeder mechanism is shown generally in FIG. 1 in which the loader mechanism is at the right-hand end thereof and indicated generally at 10 and the feeder mechanism is indicated generally at 11. This loader and feeder mechanism functions to carry blanks such as screw blanks having heads and shanks from a storage bin 12 at a high volume rate and deliver the blanks to the feeder mechanism where the blanks are oriented and delivered to an index wheel 13 which receives the blanks one after the other. The wheel 13 passes the blanks on to a suitable mechanism such as a slotting device in the form of a rotary broach such as disclosed in the application of Charles O. Lofgren and Axel Anderson, United States patent application Ser. No. 142,088, filed Oct. 2, 1961; now Patent 3,222,702.

The storage bin is formed as part of a casing 15 and has a bottom formed of sloped panels 16, 17 and 18 into which blanks may be dumped for use. A front panel 19 of the cabinet has a wear plate 20 positioned thereon and an upwardly traveling flight of a conveyor 21 travels along the wear plate 20 for elevating blanks from the bin to an upper discharge location defined by a blank receiving chute 22. The conveyor 21 is endless and is formed of a series of U-shaped or stirrup shaped links 23 having legs 24 and 25 and a base 26. As seen in FIG. 3 the legs 24 and 25 of a link are offset intermediate their length to provide end sections which overlap with the legs of an adjacent link and the lengths are connected together at this location at each side by a flush pin 27. The bottom of chute 22 is sloped from right to left, as viewed in FIG. 3, to provide a constant flow of blanks by the blanks progressively leaving a link 23 from left to right and the following link begins to discharge as the preceding one finishes.

The conveyor 21 passes about a floatingly mounted pulley 30 at the lower end thereof which is carried on an arm 31 pivoted at 32 to the cabinet with the weight of this mechanism functioning to maintain the conveyor fairly taut. The upper end of the conveyor passes about a drive pulley 33 which is driven by a motor 34 through a variable speed drive and the pulley is provided within the peripheral flanges with a pair of shoulder having flats 35 thereon with the length of the flats corresponding generally to the exposed length of a link as shown at the upper end of FIG. 2. Specifically, the shoulders of the pulley 33 have six flats to form driving engagement with the links. In the event that a jam should occur and the conveyor is not free to move with the drive pulley 33, the conveyor may slip relative to the pulley flats 35 as permitted by the floating mounting of the lower conveyor pulley 30.

As seen in FIG. 2, the downwardly traveling section of the conveyor passes within the cabinet 15 behind the cover plate 19 and then in passing around pulley 30 moves up through an opening in the bottom of the storage bin 12. In order to have the conveyor self clearing, a block 36 is mounted on the cabinet beneath the bin panel 16 to define a four-sided open chamber through which the conveyor 21 passes with the base 26 of succeeding conveyor links forming the bottom of the chamber to prevent blanks moving beneath the bin. The length of the block 36 is greater than the space between adjacent conveyor link bases 26 so as to make certain that a base 26 is within the chamber prior to the preceding link base having left the chamber.

In the event that blanks should be carried around pulley 33, an auxiliary chute 38 is positioned within the cabinet 15 having an outlet opening 39 in the side wall 40 of the cabinet whereby blanks falling into the chute may travel back to the storage bin as subsequently to be described. A roller 41 is positioned to angle the conveyor chain to a position to have blanks fall from the conveyor into the chute 38.

The feeder mechanism is connected to the cabinet 15 and supported by a post 45 defining a frame. A chute 46 connects with the previously referred to blank receiving chute 22 and is sloped downwardly to direct blanks into mechanism to be described.

A blank receiving passage is defined by a section 47 of an endless belt 48 and a guide plate 49 (FIG. 5). The endless belt passes about pulleys 50 and 51. The pulley 51 is driven by a motor 52 having a pulley 53 which drives a belt 54 passing about a pulley 55. The pulley 53 is of the variable speed type. Rotation of a knob 56 from the front of the machine provides for lengthwise adjustment (FIG. 1) of a shaft 57 abutting a motor mounting plate 58 pivoted to the frame at 59 to vary the distance between pulleys 53 and 55 to provide for variable speed drive of the pulley 55. The pulley 55 drives its mounting shaft through a slip clutch to provide for a slip in the drive if the belt 48 should jam. The drive to the belt pulley 51 is transmitted from the mounting shaft for pulley 55 through interconnecting gearing (not shown). The belt 48 is disposed with its width positioned vertically so that a blank is positioned in the passage defined by the belt section 47 and the guide plate 49 with the shank thereof between these parts and the head of the blank resting on the belt edge and the upper edge of the guide plate 49. The belt 48 travels in the direction shown by the arrow shown in FIG. 4 to provide for advance of blanks along the passage. The chute 46 is positioned to direct blanks toward the passage traveling in a direction generally along the length of belt travel to facilitate quick orientation of the blanks in the passage. This orientation is further facilitated by a driven roller 60 positioned to the rear of the guide plate 49. This roller is driven by means of a motor 61 through a belt drive 61a and has a raised spiral surface 62. This roller rotates in the direction shown by the arrow in FIG. 5 and tends to tumble blanks which have not immediately seated in the passage to facilitate their orientation in the passage. The raised spiral surface 62 tends to assist in advancing blanks along the length of the passage.

A hopper is provided beneath the passage having a front wall 63 and a rear wall 64 along with a sloped bottom 65 which leads to a sloped surface 66 on the front of the cabinet 15 overlying the storage bin 12 whereby blanks which are not positioned in the passage can return to the storage bin 12 for re-circulation. A movable continuation of the front wall 63 is provided by a swingable plate 67 which is pivoted about a pin 68. The plate can be moved to provide easier access to the blank passage.

A back plate 70 is mounted on top of a frame member 71 along which the belt section 47 travels to provide only a narrow ledge on top of the frame member 71 to prevent blanks from resting on top of the frame members.

The feeding rate of blanks is determined primarily by the speed of belt 48 and the speed of the elevating conveyor 21. It is necessary to have the speed of the belt 48 such that it will carry blanks rapidly away from the orienting location of the passage so that additional blanks coming down the chute 46 will have space in the passage in which to fall. Assistance in orienting the blanks can be obtained by use of an air blast supplied through a nozzle 72 formed in an extension 73 of a cover plate shown in broken lines in FIG. 6 for the chute 46 with the nozzle being supplied with air through a line 74 which connects to an air manifold 75, as shown in FIG. 7.

Blanks are moved from the orienting position along the passage by travel of the belt section 47 and if any blanks are improperly oriented, they are deflected away from the passage for return to the storage bin by a pair of deflecting plates 76 and 77. These deflecting plates will engage under the head of a blank which is not fully seated in the passage and cam it upwardly out of the passage for return to the storage bin. Each of these plates can be adjusted lengthwise along the passage by mounting thereof by the attaching bolt 78 in any of the holes 79 formed in the guide plate 49 and also the frame plate 71.

A first hold down plate overlies the terminal end of the passage and is indicated at 80 adjacent a cover for the belt 48. The hold down plate has a leading end 81 with an inclined surface 82 for camming downwardly and fully seating any blank by engagement with the head thereof. The vertical position of the hold down plate 80 relative to the passage can be adjusted by the positioning of a pair of threaded bolts 83 and 84 which are threaded in the hold down plate and extend beneath to engage the top surface of the frame plate 71 and thus can accommodate the passage height for the corresponding height of blank heads. In the event there should be a jam in the passage beneath the hold down plate 80, the plate can quickly be moved from the operating position shown in full line to the release position shown in broken line for access to the passage. This is accomplished by unscrewing a shaft 85 threaded in a block 86 and raising of the hold down plate 80 to position an enlarged opening 87 of a diameter the same as the shaft 85 in alignment with the shaft for movement of the guide plate 80 toward the right as viewed in FIG. 6. This quick release does not affect the height adjustment since the bolts 83 and 84 are mounted in the hold down plate 80 and merely engage against the top of the frame plate 71.

An inclined channel extends from the passage to the index wheel 13 and comprises a pair of side plates 90 and 91 as shown in FIG. 8 which are spaced apart to define the channel. The plates 90 and 91 are inclined downwardly to the index wheel 13 whereby blanks can advance by gravity down the channel and also by being advanced by the push of the blanks to the rear thereof.

A second hold down plate 92 overlies the channel and the distance from the channel can be adjusted by rotation of the threaded bolts 93 and 94 carried in the hold down plate and which engage the upper surface of the side plate 91 of the channel. The front end of the hold down plate 92 is formed at an angle to the length thereof as indicated at 95 and the hold down plate can move from a full line position to the broken line position along a line parallel to the face of the front end 95 so that in all height positions of adjustment for the hold down plate, it will be in closely abutting relation with the first hold down plate 80 for the passage to form a continuous hold down surface. This adjustment is accomplished by a plate 96 secured to the hold down plate 92 with the plate 96 having an elongated slot 97 movably mounted on a pair of bolts 98 and 99 threaded into the side plate 91 of the channel. A spring 100 about bolt 99 provides a frictional grip on the plate 96 and the plate 96 can be locked in adjusted position determined by the bolts 93 and 94 by tightening of the bolt 98 which has an oversized end of a diameter greater than the width of the slot to be tightened down on the plate 96.

When it is desired to prevent further passage of blanks from the channel a handle 102 can be pivoted counterclockwise as is shown in FIG. 7 to a generally vertical position to place an end 103 in the channel and block the passage of blanks from the channel. This position of the handle is shown in the broken line showing the hold down plate 92 in released position.

With certain sized blanks it is desired to control the supply of blanks to the feeder from the loading mechanism by demand responsive means. This means comprises a pneumatic detector 110 (FIGS. 6 and 7) in which an air line 111 directs an air blast across the channel and if there are no blanks present this air goes to a line 112 connected to a pressure responsive diaphragm 113, and the loader is free to deliver blanks to the feeding mechanism. If blanks are present, air does not get to the line 112 and the diaphragm 113 is positioned to operate a switch (not shown) which is in circuit with a solenoid 114 (FIG. 6).

The solenoid is associated with a baffle 115 positioned in the chute 46. As shown in FIG. 6, the solenoid is not energized and the baffle 115, which is in the form of a steel spring plate, is adjacent the wall of the chute and accurately positioned by an adjustable threaded member 116 to have blanks guided down into the passage between the belt and roller. When the pneumatic detector 110 detects the presence of blanks in the channel at the location of the detector and the solenoid 114 is thus energized, the plunger thereof extends to swing the baffle 115 toward the left as viewed in FIG. 6 and lead blanks to the rear of the passage whereby blanks will pass down into the hopper beneath and back into the storage bin 12 in the manner previously described.

In addition to the speed adjustments of the belt 48 and the elevating conveyor 21 and the height adjustments of the hold down plates 80 and 92, there are lateral adjustments for determining the width of the passage and the channel. These adjustments are obtained by adjusting the guide plate 49 of the passage relative to the frame plate 71 and the side plate 90 of the channel relative to the side plate 91. These adjustments are provided by adjustable mechanism shown at 121 (FIG. 6) and 120, 123 and 124, shown in FIG. 4.

The air for the mechanism is received through a line 130 connected to the manifold block 75 and a pressure reducing valve 132 is connected into the block and into the line 111 which supplies the pneumatic detector 110. This block also supplies the line 74 which leads to the nozzle 72 for assisting in seating of the blanks in the blank passage.

Mechanism, as shown more particularly in FIGS. 4 and 10, is provided to obtain proper alignment of a hex head blank in order to make certain that the slot is cut across flats of the head.

As shown in FIGS. 4 and 10, the index wheel 13 is associated with the feeding drum 150 which carries a series of blank clamp members as more particularly described in the previously referred to application of C. O. Lofgren and Axel Anderson. This drum 150 passes by the index wheel 13. In order to properly align a hex head blank, a spring blade member 151 is mounted at an end to the block 152 and extends to a position overlying the index wheel 13. A curved piece 153 is bent outward from the blade 151 to assist in guiding parts from the index wheel 13 into pockets on the drum 150. Additionally, a terminal end of the spring blade member has a cam surface 154 for engaging a flat of the hex head blank 155 and aligning the blank as it is positively gripped by the drum 150. The drum 150 in its rotation carries the blank past the cam surface and the cam surface can move out of the way due to the flexibility of the blade member 151. With this structure, a blank is caused to travel past the broaching station with the slot being cut normal to two flats thereon.

It will be seen from the foregoing description that a loading and feeding mechanism has been provided for orienting and supplying blanks at a high rate of speed. In an actual device of the type disclosed in the drawings, many different sizes of blanks have been fed at rates ranging from 900 to 1200 pieces per minute with there having been at least one run of a particular type of blank at a rate of 2200 pieces per minute.

I claim:

1. A blank loader and feeder mechanism for blanks comprising, a supply bin for holding blanks, an elevating conveyor for lifting blanks to a discharge location, and chute means for receiving blanks discharged from said conveyor, said conveyor being endless and including a series of interconnected links, a pair of spaced apart pulleys about which said links travel, one of said pulleys having a plurality of flat surfaces for individual engagement one with a link, and the other pulley being movably mounted whereby a jam in said conveyor will permit stopping of the conveyor by relative movement between the pulley surfaces and links as permitted by slack in the conveyor resulting from movement of the movable pulley.

2. A blank loader and feeder mechanism as defined in claim 1 in which said conveyor links are each generally U-shaped with the legs of adjacent links interconnected by flush pins, each of said legs having an offset whereby an adjacent link leg overlapped therewith does not increase the width of the conveyor.

3. A blank loader and feeder mechanism as defined in claim 2 in which said supply bin has an opening through which an upwardly traveling length of the conveyor passes, and means positioned in said opening defining a four-sided open-ended chamber of a length greater than the spacing between adjacent conveyor pockets defined by adjacent conveyor links whereby the conveyor is self-clearing in passing through said chamber and upwardly through said bin with the base of each U-shaped link defining the bottom of said chamber as it passes therethrough.

4. A blank loader and feeder mechanism comprising: a supply bin for holding blanks; an elevating conveyor for lifting blanks to a discharge location; chute means for receiving blanks from said conveyor; and means for moving said conveyor including a driving member and an idler member, said conveyor being trained over each of said members and one of said members being movable relative to the other to permit movement of said driven member relative to said conveyor when said conveyor is jammed.

5. A blank loader and feeder mechanism as defined in claim 4 wherein the movable one of said members is gravity biased into a conveyor engaging position.

6. A blank loader and feeder mechanism comprising: a supply bin for holding blanks, said bin having inclined walls converging downwardly toward an opening, and one of said walls extending upwardly from said bin; a discharge chute above said bin adjacent said one wall; an elevating conveyor positioned for movement through said opening, along said one wall, and over said discharge chute; scoop means on said conveyor disposed generally perpendicularly with respect to the path of travel of said conveyor and cooperating with said one wall for elevating blanks from said bin, said scoop means depositing blanks in said discharge chute upon movement of said conveyor past said wall and into lengthwise confronting relationship with respect to said discharge chute; and means for moving said conveyor.

7. A blank loader and feeder mechanism as defined in claim 6 in which said means for moving said conveyor includes a first rotatable member above said discharge chute, and a second rotatable member below said bin; and wherein said conveyor includes a first reach outwardly of said one wall and a second reach inwardly of said one wall.

8. A blank loader and feeder mechanism as defined in claim 7 wherein an auxiliary chute is positioned adjacent the second reach of said conveyor and is sloped toward said supply bin.

9. A blank loader and feeder mechanism comprising: a supply bin for holding blanks; a discharge chute above said bin; and an elevating conveyor for lifting blanks from said bin to said chute, said conveyor having a plurality of adjacent compartments along the length thereof, each of said compartments having a blank discharge plate therein disposed at an angle with respect to said chute and movable progressively from end to end past said chute, whereby said blanks are discharged progressively from end to end of said discharge plates into said chute as the discharge plates move therepast.

10. A blank loader and feeder mechanism comprising: a supply bin for holding blanks; a discharge chute above said bin; and an elevating conveyor for lifting blanks from said bin to said chute, said conveyor being endless and including a series of interconnected generally U-shaped links each defining an open sided conveyor compartment, adjacent links having their legs positioned in overlapping relationship, each of said legs having an offset whereby an adjacent link leg overlapped therewith does not increase the width of the conveyor, and flush pins interconnecting the overlapped link legs.

11. A blank loader and feeder mechanism for blanks comprising: a supply bin for holding blanks; means in the bottom of said bin defining an opening therein; an elevating conveyor for lifting blanks from said bin to a discharge location, and having an upwardly traveling length passing through said opening, said conveyor having a plurality of adjacent pockets along the length thereof; chute means for receiving blanks discharged from said conveyor; and means positioned below said opening defining a four-sided open-ended chamber of a length greater than the spacing between adjacent conveyor pockets whereby the conveyor is self-clearing in passing through said chamber and upwardly through said bin.

12. A blank loader and feeder mechanism comprising, a supply bin for holding blanks, first conveyor means in the form of an elevating conveyor for lifting blanks to a discharge location, said elevating conveyor having a series of parallel shelves, and second conveyor means rearwardly of said elevating conveyor at said discharge location for receiving blanks from said elevating conveyor, said second conveyor means being disposed at a downwardly inclined angle with respect to the length of said shelves to position an initial blank entrance portion of said second conveyor means below a final blank entrance portion thereof, so that the leading end of each shelf will first move into discharging relationship with respect to the initial blank entrance portion of said second conveyor means, the intermediate portion of each shelf will progressively move into discharging relationship with respect to said second conveyor means between said initial and final blank entrance portions, and the trailing end of each shelf will last move into discharging relationship with respect to the final blank entrance portion of said second conveyor means; whereby blanks are continuously discharged from end to end of each shelf into said second conveyor means as the elevating conveyor advances relative thereto.

13. A blank loader and feeder mechanism as set forth in claim 12 wherein said second conveyor means is a discharge chute.

14. A blank loader and feeder mechanism as set forth in claim 9 wherein the blank discharge plates of adjacent compartments are spaced sufficiently closely to one another such that discharge begins to take place from one end of one discharge plate as discharging from the opposite end of a preceding discharge plate finishes.

References Cited
UNITED STATES PATENTS

| | | | |
|---|---|---|---|
| 364,024 | 5/1887 | Lawten | 198—122 |
| 777,376 | 12/1904 | James | 198—152 X |
| 2,609,912 | 9/1952 | Engel | 198—48 |
| 3,095,680 | 7/1963 | Thornton | 198—109 |

EVON C. BLUNK, *Primary Examiner.*

SAMUEL F. COLEMAN, *Examiner.*

A. C. HODGSON, *Assistant Examiner.*

UNITED STATES PATENT OFFICE
CERTIFICATE OF CORRECTION

Patent No. 3,332,532                        July 25, 1967

Axel Anderson

It is certified that error appears in the above identified patent and that said Letters Patent are hereby corrected as shown below:

In the heading to the printed specification, line 4, "Illinois" should read -- Delaware --.

Signed and sealed this 10th day of March 1970.

(SEAL)
Attest:

Edward M. Fletcher, Jr.                 WILLIAM E. SCHUYLER, JR.
Attesting Officer                            Commissioner of Patents